(12) United States Patent
Yonetani et al.

(10) Patent No.: US 6,496,308 B2
(45) Date of Patent: Dec. 17, 2002

(54) RELAY OPTICAL SYSTEM

(75) Inventors: Atsushi Yonetani, Tama (JP); Yasushi Fujimoto, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/878,183

(22) Filed: Jun. 12, 2001

(65) Prior Publication Data

US 2002/0027710 A1 Mar. 7, 2002

(30) Foreign Application Priority Data

Jun. 13, 2000 (JP) ........................................ 2000-182302
Jan. 18, 2001 (JP) ........................................ 2001-010724

(51) Int. Cl.[7] ............................................. G02B 25/00
(52) U.S. Cl. ........................................ 359/434; 359/646
(58) Field of Search .................................. 359/434, 643, 359/644, 645, 646, 793

(56) References Cited

U.S. PATENT DOCUMENTS

| | | | |
|---|---|---|---|
| 5,227,918 A | 7/1993 | Suzuki et al. ............... | 359/644 |
| 5,587,837 A | * 12/1996 | Kebo .......................... | 359/643 |
| 5,691,850 A | * 11/1997 | Arisaka ....................... | 359/644 |
| 5,726,808 A | 3/1998 | Suzuki ........................ | 359/645 |

FOREIGN PATENT DOCUMENTS

| | | |
|---|---|---|
| JP | 06-331903 | 12/1994 |
| JP | 09-054258 | 2/1997 |
| JP | 10-039235 | 2/1998 |

OTHER PUBLICATIONS

02–222914, Sep. 1990, Japan, Tanaka et al. (Abstract).
09–133875, May 1997, Japan, Suzuki (Abstract).

* cited by examiner

Primary Examiner—Mark A. Robinson
(74) Attorney, Agent, or Firm—Pillsbury Winthrop LLP

(57) ABSTRACT

The relay optical system comprises, in order from the intermediate image position I toward the the exit pupil EXP side, a first unit G1 having a negative refracting power and a second unit G2 having a positive refracting power, wherein the distance from the rearmost surface of the second unit to the exit pupil position is at least 30 mm. The relay optical system allows a photographing apparatus to be mounted on a microscope without the microscope and the photographing apparatus excluding each other from their predetermined positions.

6 Claims, 21 Drawing Sheets

FIG.7A

SPHERICAL
ABERRATION

ASTIGMATISM

DISTORTION

SPHERICAL ABERRATION

ASTIGMATISM

DISTORTION

IM.H11

×0.7

×0.5

10.00

-10.00

SPHERICAL ABERRATION  ASTIGMATISM  DISTORTION

FIG.20A

SPHERICAL ABERRATION

ASTIGMATISM

DISTORTION

IM. H10

×0.7
×0.5

-10.00   10.00

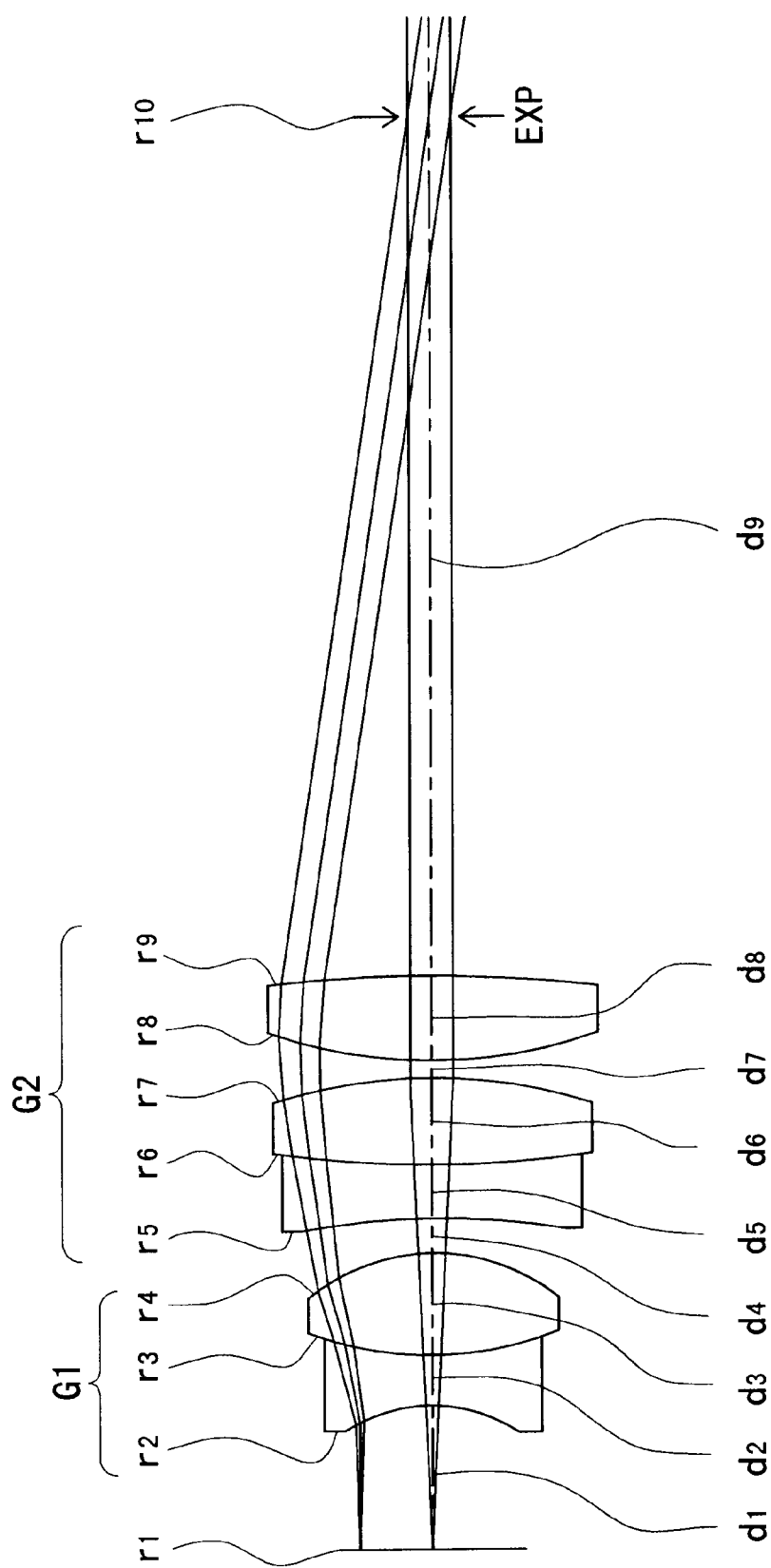

RELAY OPTICAL SYSTEM

BACKGROUND OF THE INVENTION

1. Field of the Invention

The present invention relates to a relay optical system used for photographing, with an electronic image-pickup camera or the like, an image formed by an objective lens.

2. Description of Related Art

As measures to record an image formed by an objective lens of a microscope, there are the photography using a silver halide camera and the photography using a TV camera. According to the photography with a silver halide camera, a sample image is recorded on a film.

On the other hand, the photography with a TV camera is disclosed in Japanese Patent Application Preliminary Publication (KOKAI) No. Hei 6-331903, where a TV camera connecting tube that comprises an ocular observation barrel, an adapter, an attachment for a TV camera, and a photographing section of the TV camera is shown. Although an image sensor is not particularly described in this document, a solid-state image sensor (CCD), for example, may be used.

Conventionally, the number of pixels of a solid-state image sensor is roughly determined in accordance with the number of scanning lines of a TV monitor. For example, an image sensor with 512×512 pixels or 640×512 pixels is used for the standard format (NTSC), and an image sensor with 1024×768 pixels is used for the high-definition type.

As described above, according to the conventional photography, a sample image is recorded on a film, while, in recent years, digital cameras using, as the recording medium, solid state image sensors have appeared in the market, to be popularized. The digital camera is characterized in its large number of pixels for the area of the solid-state image sensor. In early years, hundreds of thousands of pixels would be provided for the ⅓-inch type, while, in recent years, one or two millions of pixels or more are provided for the ⅔-inch or ½-inch type.

However, the digital camera is constructed to have a photographing lens fixed to the camera body and thus the entrance pupil position is placed inside the photographing lens or the camera body. Therefore, if a person would try to use the camera in combination with a microscope for photographing a sample image, he has to position the body of the digital camera close to the lens barrel of the microscope so as to make the exit pupil position (or a position conjugate with the exit pupil position) of the microscope coincide with the entrance pupil position of the digital camera. As a result, the microscope and the digital camera would exclude each other from their predetermined positions, which is a problem.

It is noted that each of Japanese Patent Application Preliminary Publication (KOKAI) No. Hei 2-222914, Japanese Patent Application Preliminary Publication (KOKAI) No. Hei 9-54258, Japanese Patent Application Preliminary Publication (KOKAI) No. Hei 9-133875 and Japanese Patent Application Preliminary Publication (KOKAI) No. Hei 10-39235 discloses an optical system used for observation of an image (intermediate image) formed by an objective lens. However, such an optical system is directed for observation via human eyes and thus is difficult of use as a relay optical system for a photographing apparatus.

SUMMARY OF THE INVENTION

An object of the present invention is to provide a relay optical system that allows a photographing apparatus to be mounted on a microscope without the microscope and the photographing apparatus excluding each other from their predetermined positions.

A relay optical system according to the present invention comprises, in order from the intermediate image position toward the exit pupil side, a first unit having a negative refracting power and a second unit having a positive refracting power and is characterized in that a distance from the rearmost lens surface of the second lens unit to the exit pupil position is at least 30 mm.

Also, it is characterized in comprising at least four lenses.

Also, it is characterized in that the distance from the rearmost lens surface of the second unit to the exit pupil position is in a range from 30 mm to 160 mm.

Also, it is characterized in that the distance from the rearmost lens surface of the second unit to the exit pupil position is in a range from 30 mm to 90 mm.

This and other objects as well as features and advantages of the present invention will become apparent from the following detailed description of the preferred embodiments when taken in conjunction with the accompanying drawings.

BRIEF DESCRIPTION OF THE DRAWINGS

FIGS. 7A–7C are aberration diagrams regarding the fourth embodiment.

FIGS. 10A–10C are aberration diagrams regarding the sixth embodiment.

FIGS. 20A–20C are aberration diagrams regarding the thirteenth embodiment.

FIG. 21 is a sectional view of the relay optical system according to the fourteenth embodiment of the present invention taken along the optical axis.

DETAILED DESCRIPTION OF THE PREFERRED EMBODIMENTS

Description will be made of the modes for carrying out the present invention based on the embodiments presented with the drawings.

A relay optical system according to the present invention comprises, in order from the intermediate image position toward the exit side, a first unit having a negative refracting power and a second unit having a positive refracting power. A distance $d_{EXP}$ from the rearmost lens surface of the second unit to the exit pupil position is at least 30 mm.

Also, the constituent lenses of the relay optical system include at least four lenses. In this configuration, it is preferred that the distance $d_{EXP}$ from the rearmost lens surface of the second unit to the exit pupil position is in a range from 30 mm to 160 mm.

Figure 1:
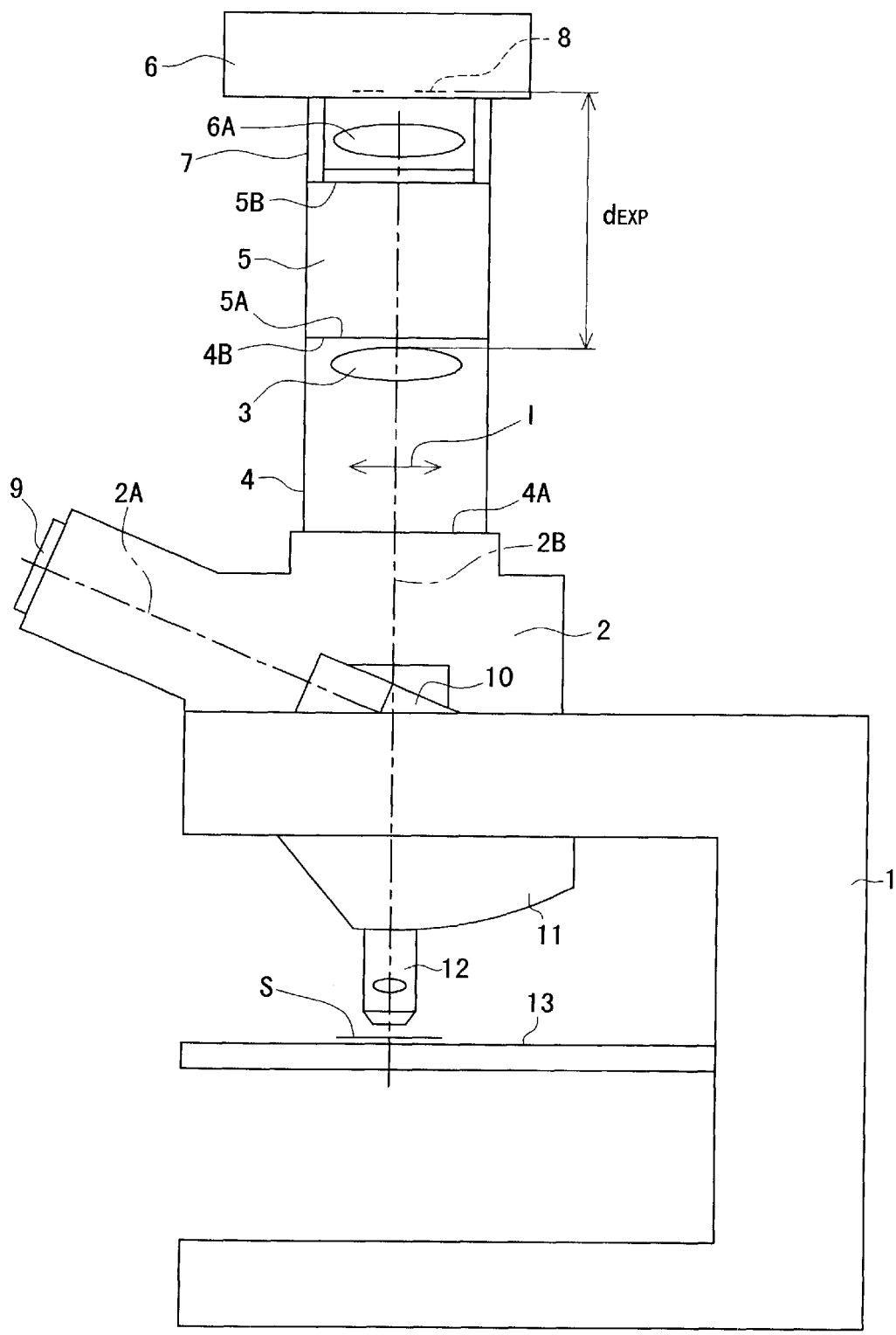
FIG. 1 is a view to show the schematic configuration of a microscope in which the relay optical system according to the present invention is used.

In reference to FIG. 1, which shows the situation where the relay optical system of the present invention is used with a microscope, the distance $d_{EXP}$ is equivalent to the distance from the most digital camera-side lens surface of the relay optical system 3 to the position of the entrance pupil 8 of the digital camera 6. Thus, if the distance $d_{EXP}$ is shorter than the lower limit value of 30 mm, an attempt to make the exit pupil position of the relay optical system 3 coincide with the entrance pupil position of the photographing lens 6A of the digital camera 6 would fail, because the space between the observation barrel 2 and the digital camera 6 becomes so small that the observation barrel 2 and the digital camera 6 would exclude each other from their predetermined positions. In addition, if a digital camera having a photographing lens with a long focal length is coupled, a problem occurs in that rays corresponding to the periphery of the image are eclipsed, because the entrance pupil of such a type of digital camera is positioned close to the image sensor thereof.

If the distance $d_{EXP}$ exceeds the upper limit value of 160 mm, the observation barrel 2 and the digital camera 6 are so distant from each other as to degrade the stability, and thus photographing of a sharp sample image is obstructed. In addition, it is made difficult to increase the magnification of the relay optical system 3 to be greater than 3×, and accordingly, a problem occurs in that a full-angle image, which the photographing lens 6A is inherently capable of providing, cannot be photographed without eclipse.

Also, in the above-mentioned configuration, it is desirable that the relay optical system of the present invention satisfies the following condition (1):

$$0.3 \leq L/f \leq 1.25 \tag{1}$$

where L is a total length of the relay optical system defined by the distance from a lens surface on which light is first incident to a lens surface from which the light is emergent lastly, and f is a focal length of the relay optical system.

Regarding Condition (1), a value of L/f smaller than the lower limit value, 0.3 means that the number of lenses is small, which makes it difficult to compensate aberrations of the relay optical system in good condition. A value exceeding the upper limit value, 1.25 makes it difficult to secure the necessary distance to the exit pupil position. In this regard, it is much desirable to satisfy the following condition (1'):

$$0.4 \leq L/f \leq 1.25 \tag{1'}$$

Also, it is desirable that the following conditions (2)–(4) are satisfied in place of or in addition to Condition (1).

$$-12 \leq f_1/f \leq -0.2 \tag{2}$$

$$0.45 \leq f_2/f \leq 1.5 \tag{3}$$

$$0.9 \leq d_{EXP}/f \leq 2.5 \tag{4}$$

where $f_1$ is a focal length of the first unit, $f_2$ is a focal length of the second unit, and $d_{EXP}$ is the distance from the rearmost lens surface of the second unit to the exit pupil position.

Regarding Condition (2), a value of $f_1/f$ smaller than the lower limit value, −12 means that the refracting power of the first unit is small, and accordingly Petzval sum cannot be small, or the curvature of field cannot be sufficiently compensated. A value exceeding the upper limit value, −0.2 means that the refracting power of the first unit is large, which makes it difficult to compensate aberrations of the entire relay optical system in good condition and, in addition, necessitates a large outer diameter of lenses of the second unit.

Regarding Condition (3), a value of $f_2/f$ smaller than the lower limit value, 0.45 means that the refracting power of the second unit is large and that the refracting power of the first unit also is large, accordingly. In this case, since amount of aberrations caused by each of the first unit and the second unit becomes large, the spherical aberration and the curvature of field cannot cancel out in the first unit and the second unit, and thus it is difficult to achieve well-balanced compensation of aberrations. Also, a value exceeding the upper limit value, 1.5 means that the refracting power of the second unit is small and that the refracting power of the first unit also is small, accordingly. As a result, shortage of the negative refracting power makes it difficult to achieve effective compensation of the curvature of field.

Regarding Condition (4), if a value of $d_{EXP}/f$ is smaller than the lower limit value, 0.9 or larger than the upper limit value, 2.5, it is difficult to set a photographing apparatus, where it is used in combination with a microscope, in an appropriate position in a good balance. It is noted that the value of $d_{EXP}$ is measured under the condition where the entrance pupil of the relay optical system is positioned at the substantially infinite distance.

The relay optical system according to the first mode of the present invention is composed of four lenses. In the first configuration based on this mode, the first unit with a negative refracting power is composed of a cemented lens, and the second unit with a positive refracting power is composed of two positive lenses. Also, in the second configuration based on this mode, the first unit with a negative refracting power is composed of a negative meniscus lens directing a convex surface thereof toward the intermediate image side, and the second unit with a positive refracting power is composed of a cemented lens and a positive lens. Also, in the third configuration based on this mode, the first unit with a negative refracting power is composed of a biconcave lens, and the second unit with a positive refracting power is composed of a cemented lens and a positive lens.

In the first, second or third configuration, Condition (1) or Condition (1') set fourth above is satisfied.

Also, in the first, second or third configuration, it is desirable that the following conditions (2'), (3) and (4') are satisfied:

$$-12 \leq f_1/f \leq -0.5 \quad (2')$$

$$0.45 \leq f_2/f \leq 1.5 \quad (3)$$

$$0.9 \leq d_{EXP}/f \leq 1.5 \quad (4')$$

Significance of the upper and lower limit values of Condition (3) is explained above. Significance of the upper and lower limit values of Conditions (2'), (4') is the same as explained above regarding Conditions (2), (4). In the case where the relay optical system is composed of four lenses as in the first, second or third configuration, it is desirable that $f_1/f$ falls within the range determined by Condition (2'), that $f_2/f$ falls within the range determined by Condition (3), and that $d_{EXP}/f$ falls within the range determined by Condition (4').

FIG. 1 shows a microscope in which the relay optical system according to the present invention is used. In the drawing, the reference numeral 1 represents a microscope body, the reference numeral 2 represents an observation barrel, the reference numeral 3 represents a relay optical system, the reference numeral 4 represents a first holder member which holds the relay optical system 3, the reference numeral 5 represents a second holder member, the reference numeral 6 represents a digital camera (electronic image-pickup camera), and the reference numeral 8 represents the entrance pupil of a built-in photographing lens 6A. Also, the reference numeral 11 represents a revolver, the reference numeral 12 represents an objective lens, and the reference numeral 13 represents a stage on which a sample S is placed.

The lower section of the observation barrel 2 is fixed on the top surface of the microscope body 1. An observation path 2A for ocular observation of an image of the sample S and a photographing path 2B for photographing with the digital camera 6 are provided inside the observation barrel 2. An eyepiece 9 is disposed in the observation path 2A to allow an observer ocular observation. Switching between the observation path 2A and the photographing path 2B is made by insertion or removal of a prism 10 in or out of the path via manipulation of a switching lever, not shown. The reference symbol I represents an intermediate image, which is formed outside the observation barrel 2.

On the upper side of the observation barrel 2, the first holder member 4 is provided. The first holder member 4 is connected, via the lower end 4A thereof, with the observation barrel 2. The first holder member 4 has a hollow cylindrical shape so that the relay optical system 3 is arranged inside.

The relay optical system 3 is held inside the first holder member 4 in the vicinity of the upper end 4B thereof in such a manner that the position of the sample image I coincides with the front-side focal point of the relay optical system 3 or the vicinity thereof. Accordingly, rays from every point on the sample image I enter the digital camera after being converted by the relay optical system 3 into a beam of parallel rays or a beam of substantially parallel rays. Also, the exit pupil (or a conjugate point thereto) of the microscope and the entrance pupil 8 of the digital camera 6 are made to coincide or substantially coincide by the relay optical system 3.

On the upper side of the first holder member 4, the second holder member 5 is mounted in such a manner that the upper end 4B of the first holder member 4 and the lower end 5A of the second holder member 5 are connected together. The second holder member 5 has a hollow cylindrical shape similar to the first holder member 4, but no lens is held inside.

On the upper side of the second holder member 5, the digital camera 6 is attached. An adapter 7 for connection with the second holder member 5 is provided outside the rim of the photographing lens 6A. The end of the adapter 7 and the upper end 5B of the second holder member 5 are connected together. If structure allows, the digital camera 6 may be directly connected with the holder member 5.

For connection between members, e.g. connection between the microscope body 1 and the observation barrel 2, and connection between the second holder member 5 and the adapter 7, a conventional mechanism such as the screw mechanism or the round dovetail mechanism is appropriately selected.

In the case where the relay optical system 3 is composed of four lenses, it is desirable that the following condition (5) is satisfied:

$$30 \ mm \leq d_{EXP} \leq 90 \ mm \quad (5)$$

Arranging $d_{EXP}$ to be equal to or smaller than 90 mm allows the full-angle image, which the photographing lens 6A is inherently capable of providing, to be photographed without eclipse.

Since the relay optical system 3 according to the present invention satisfies Condition (5), the digital camera 6 and the observation barrel 2 can be sufficiently spaced away from each other under stable condition. Therefore, photographing of a sample image can be performed under the stable condition without the digital camera 6 and the observation barrel 2 excluding each other from their predetermined positions. Also, since the optical system is adapted to the optical characteristics of the photographing lens 6A of the digital camera, a good sample image without eclipse can be obtained over a full photographing angular range.

Also, it is much preferable that the relay optical system 3 satisfies the following condition (6) in place of Condition (5):

$$60 \ mm \leq d_{EXP} \leq 80 \ mm \quad (6)$$

The relay optical system according to the second mode of the present invention is composed of five lenses. In the fourth configuration based on this mode, the first unit with a negative refracting power is composed of a singlet lens, and the second unit with a positive refracting power is composed of, in order from the intermediate image position toward the exit side, a cemented lens and two positive lenses. Also, in the fifth configuration based on this mode, the first unit with a negative refracting power is composed of a singlet lens as in the fourth configuration, and the second unit with a positive refracting power is composed of, in order from the intermediate position toward the exit side, a positive lens, a cemented lens and a positive lens. Also, in the sixth configuration based on this mode, the first unit with a negative refracting power is composed of a negative cemented lens, and the second unit with a positive refracting power is composed of, in order from the intermediate image position to the exit side, a cemented lens and a positive lens.

In the fourth, fifth or sixth configuration, Condition (1) or Condition (1') set fourth above is satisfied.

Also, in the fourth, fifth or sixth configuration, it is desirable that the following conditions (2"), (3') and (4") are satisfied:

$$-2 \leq f_1/f \leq -0.2 \quad (2")$$

$$0.45 \leq f_2/f \leq 1.2 \quad (3')$$

$$1 \leq d_{EXP}/f \leq 2.5 \quad (4")$$

Significance of the upper and lower limit values of Conditions (2"), (3'), (4") is the same as explained above regarding Conditions (2), (3), (4). In the case where the relay optical system is composed of five lenses as in the fourth, fifth or sixth configuration, it is desirable that $f_1/f$ falls within the range determined by Condition (2"), that $f_2/f$ falls within the range determined by Condition (3'), and that $d_{EXP}/f$ falls within the range determined by Condition (4").

In the case where the relay optical system 3 is composed of five lenses, it is desirable that the following condition (7) is satisfied:

$$60 \text{ mm} \leq d_{EXP} \leq 160 \text{ mm} \quad (7)$$

Since the relay optical system 3 according to the present invention satisfies Condition (7), the digital camera 6 and the observation barrel 2 can be sufficiently spaced away from each other under stable condition. Therefore, photographing of a sample image can be performed under the stable condition without the digital camera 6 and the observation barrel 2 excluding each other from their predetermined positions. Also, since the optical system is adapted to the optical characteristics of the photographing lens 6A of the digital camera, a good sample image without eclipse can be obtained over a full photographing angular range.

Also, it is much desirable that the relay optical system 3 satisfies the following condition (8) in place of Condition (7):

$$90 \text{ mm} \leq d_{EXP} \leq 160 \text{ mm} \quad (8)$$

Also, it is still much desirable that the relay optical system 3 satisfies the following condition (9) in place of Condition (7):

$$90 \text{ mm} \leq d_{EXP} \leq 130 \text{ mm} \quad (9)$$

In a microscope with which the relay optical system of the present invention is used, the digital camera 6 is connected with the microscope via the first holder member 4, the second holder member 5 and the adapter 7, as described above. Here, the first holder member 4, the second holder member 5 and the adapter 7 are fabricated with considerable accuracy, to have dimensions as designed.

On the other hand, the fabrication accuracy of the body of the digital camera 6 is not so high as that of the adapter 7 or the holder member 5. Therefore, when the digital camera 6 is mounted on the adapter 7, the position of the image formed by the photographing lens 6A in reference to the lateral end face of the digital camera is slightly displaced from the designed position. As a result, even if focusing is made on the sample via the eyepiece, an in-focus image is not necessarily formed on the image pickup surface of the digital camera 6.

Therefore, with the digital camera 6 provided with a display device for monitoring, e.g. a liquid crystal display surface, the observer should perform focus adjustment while viewing an image displayed on the liquid crystal display surface. However, the long distance from the liquid crystal display surface to the focusing knob of the microscope body makes it difficult to perform focus adjustment.

In such a case, use of the auto-focus function of the digital camera 6 facilitates accurate confocal adjustment of the digital camera 6 in reference to the image by the eyepiece. This method is especially advantageous in the following situation.

Focusing operation is difficult in the case of photographing using a low-magnification objective lens. Specifically, it is considerably difficult to perform focus adjustment by operating the focusing knob of the microscope body as monitoring the liquid crystal display surface. However, if confocality with the image via the eyepiece is detected by the above-described method, simple focus adjustment via the eyepiece simultaneously achieves focus adjustment for the photographed image. Moreover, since the eyepiece is positioned close to the focusing knob of the microscope body, focusing can be performed easily. In this way, operability is improved. In addition, since the eyepiece provides an image with better quality than the liquid crystal display surface does, more accurate focusing can be achieved even by ocular observation.

When the photographing lens 6A is moved for focus adjustment, the pupil position (entrance pupil position) of the photographing lens 6A is shifted from the pupil position (exit pupil position) projected by the relay optical system 3. However, the amount of shift is very little and thus would not cause a considerable problem.

Embodiment 1

Figure 2:
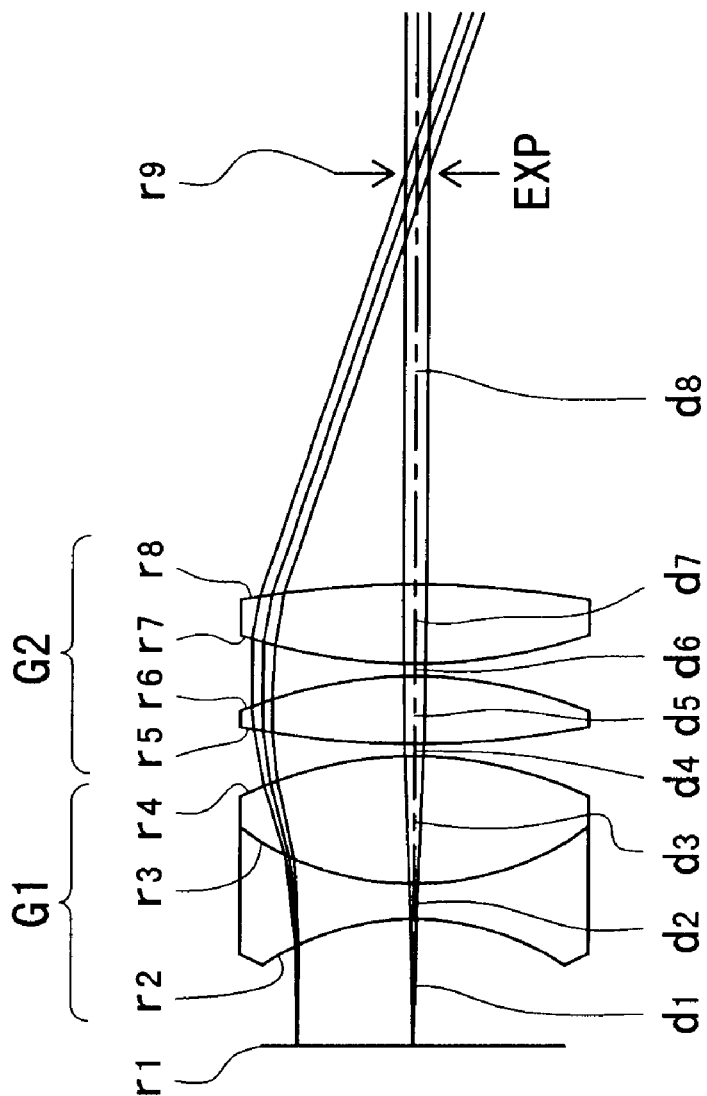
FIG. 2. is a sectional view of the relay optical system according to the first embodiment of the present invention taken along the optical axis.

FIG. 2 shows the first embodiment of the relay optical system according to the present invention. This embodiment is directed to the relay optical system of the first configuration, where the first unit G1 with a negative refracting power is composed of a cemented lens having a biconcave lens and a biconvex lens arranged in order from the intermediate image side to the exit pupil EXP side, and the second unit G2 with a positive refracting power is composed of two biconvex lenses.

All the surfaces of the biconcave lens and the biconvex lens of the first unit G1 with a negative refracting power have the same absolute value of radius of curvature. The two biconvex lenses of the second unit G2 with a positive refracting power differ from each other in shape and are arranged so that the surfaces with the smaller absolute values of radius of curvature of the respective lenses face one another.

The numerical data of this embodiment are shown below. In the data, the column R shows the radius of curvature of each lens surface, the column T shows the thickness of each lens or airspace between lenses, which is represented by $d_1$, $d_2$, $d_3$ ... in the drawing, the column nd shows the refractive index of each lens for d-line rays, and the column vd shows the Abbe's number of each lens. This manner is commonly used in the subsequent embodiments also. "INF" appearing in the line of surface number 1 means that it is the intermediate image position, and "INF" appearing in the line of surface number 9 means that it is the exit pupil EXP position.

| Surface No. (r) | R | T | nd | vd |
|---|---|---|---|---|
| 1 | INF | 11.1142 | | |
| 2 | −30.393 | 4.2000 | 1.84666 | 23.78 |

-continued

| Surface No. (r) | R | T | nd | vd |
|---|---|---|---|---|
| 3 | 30.393 | 10.9000 | 1.58913 | 61.14 |
| 4 | −30.393 | 1.0000 | | |
| 5 | 145.200 | 6.1000 | 1.48749 | 70.23 |
| 6 | −45.256 | 1.0000 | | |
| 7 | 34.698 | 8.4000 | 1.48749 | 70.23 |
| 8 | −87.355 | 35.9300 | | |
| 9 | INF | | | |

Figure 3:
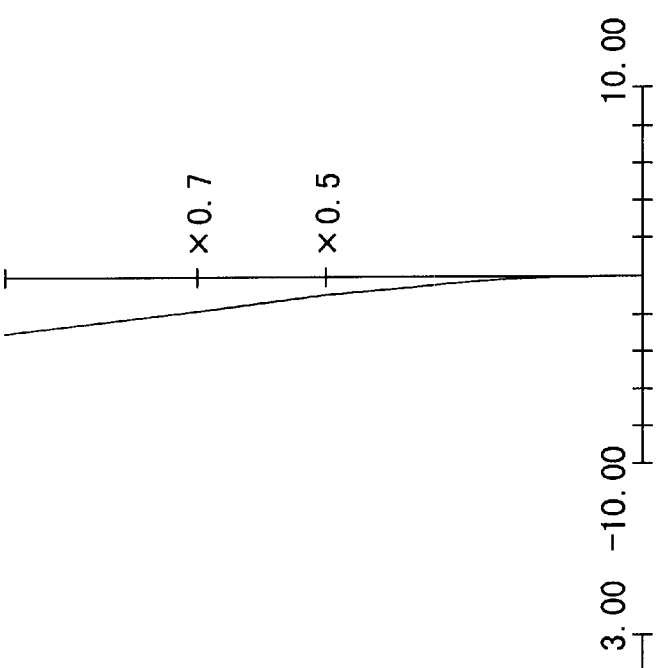
FIGS. 3A–3C are aberration diagrams regarding the first embodiment.

Regarding the spherical aberration, astigmatism and distortion of this embodiment, aberration diagrams are shown in FIGS. 3A–3C.

Embodiment 2

Figure 4:
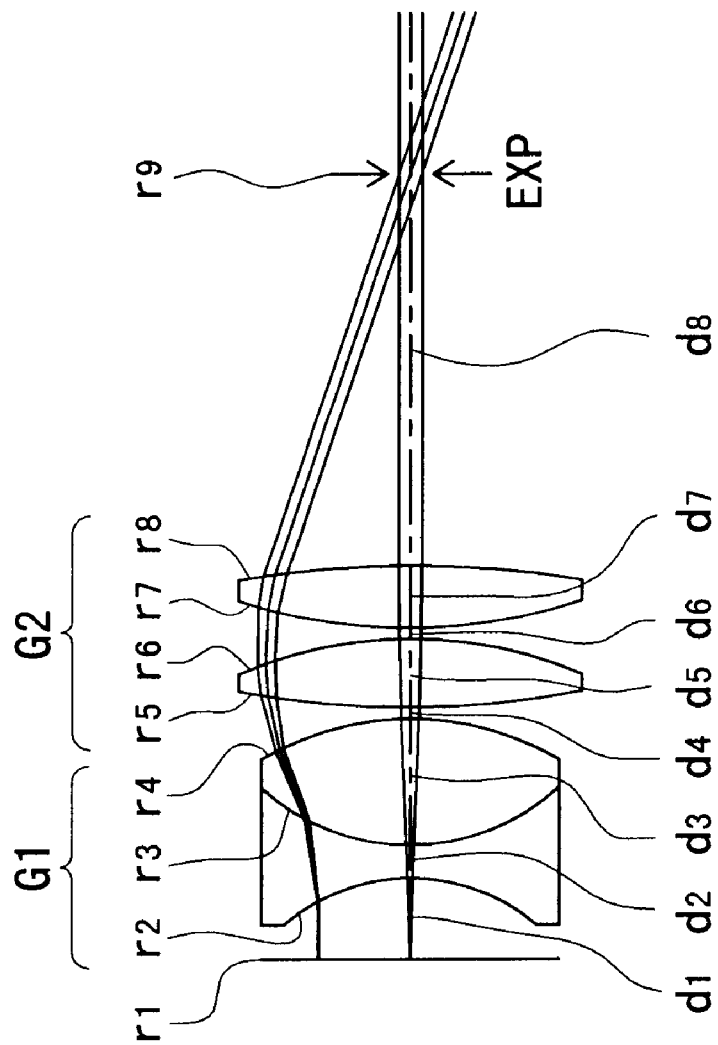
FIG. 4 is a sectional view of the relay optical system according to the second embodiment of the present invention taken along the optical axis.

FIG. 4 shows the second embodiment of the relay optical system according to the present invention. In this embodiment also, as in Embodiment 1, the first unit G1 with a negative refracting power is composed of a cemented lens having a biconcave lens and a biconvex lens arranged in order from the intermediate image side, and the second unit G2 with a positive refracting power is composed of two biconvex lenses.

The surfaces of the biconcave lens of the first unit G1 with a negative refracting power have the same absolute value of radius of curvature. The two biconvex lenses of the second unit G2 with a positive refracting power have an identical shape and are arranged so that the surfaces with the smaller absolute value of radius of curvature of the respective lenses face one another.

The numerical data of this embodiment are shown below.

| Surface No. (r) | R | T | nd | vd |
|---|---|---|---|---|
| 1 | INF | 7.1015 | | |
| 2 | −19.467 | 3.0000 | 1.84666 | 23.78 |
| 3 | 19.467 | 11.4000 | 1.58913 | 61.14 |
| 4 | −24.763 | 1.0000 | | |
| 5 | 68.589 | 6.0000 | 1.48749 | 70.23 |
| 6 | −36.368 | 1.0000 | | |
| 7 | 36.368 | 6.0000 | 1.48749 | 70.23 |
| 8 | −68.589 | 35.5870 | | |
| 9 | INF | | | |

Aberration diagrams of this embodiment are similar to those of Embodiment 1 and can be calculated by ray tracing using the above numerical data. Therefore, they are not shown.

Embodiment 3

Figure 5:
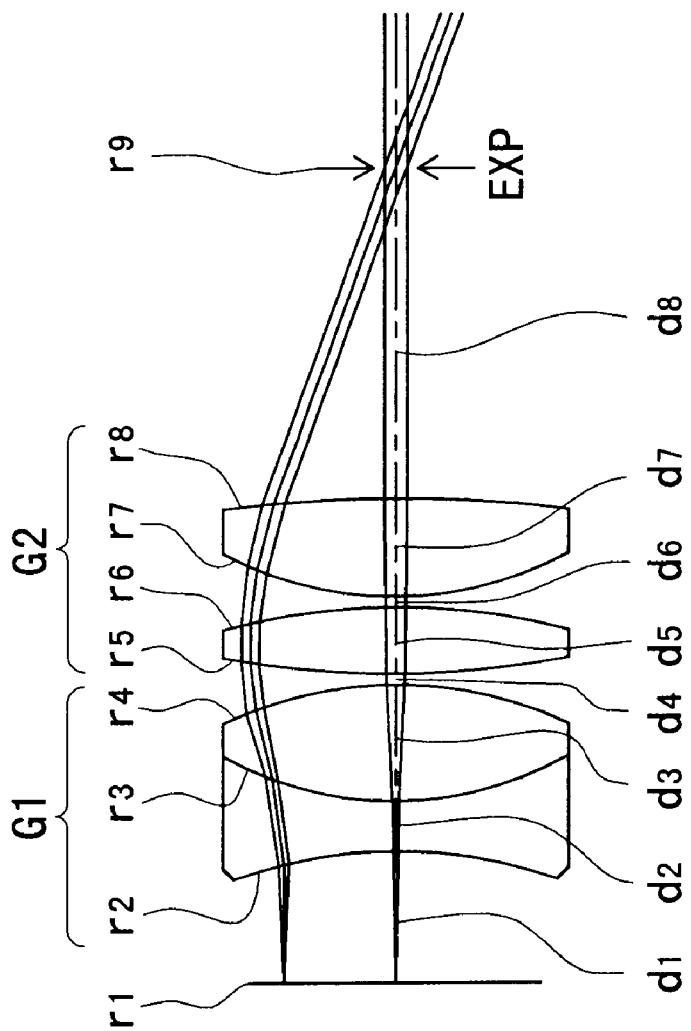
FIG. 5 is a sectional view of the relay optical system according to the third embodiment of the present invention taken along the optical axis.

FIG. 5 shows the third embodiment of the relay optical system according to the present invention. In this embodiment also, as in Embodiment 1, the first unit G1 with a negative refracting power is composed of a cemented lens having a biconcave lens and a biconvex lens arranged in order from the intermediate image side, and the second unit G2 with a positive refracting power comprises biconvex lenses.

The surfaces of the biconvex lens of the first unit G1 with a negative refracting power have the same absolute value of radius of curvature. The two biconvex lenses of the second unit G2 with a positive refracting power differ from each other in shape and are arranged so that the surfaces with the smaller absolute values of radius of curvature of the respective lenses face one another.

The numerical data of this embodiment are shown below.

| Surface No. (r) | R | T | nd | vd |
|---|---|---|---|---|
| 1 | INF | 12.2390 | | |
| 2 | −45.876 | 5.1000 | 1.84666 | 23.78 |
| 3 | 32.066 | 11.0000 | 1.58913 | 61.14 |
| 4 | −32.066 | 1.0000 | | |
| 5 | 97.713 | 5.9000 | 1.48749 | 70.23 |
| 6 | −71.183 | 1.0000 | | |
| 7 | 29.992 | 9.2000 | 1.48749 | 70.23 |
| 8 | −168.989 | 31.0529 | | |
| 9 | INF | | | |

Aberration diagrams of this embodiment are similar to those of Embodiment 1 and can be calculated by ray tracing using the above numerical data. Therefore, they are not shown.

Embodiment 4

Figure 6:
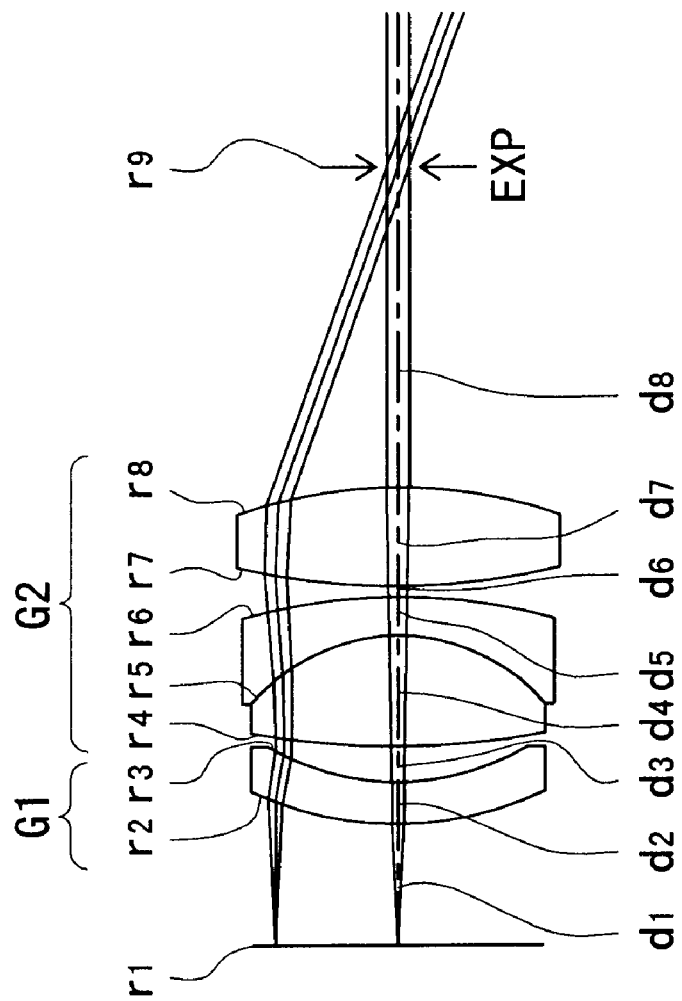
FIG. 6 is a sectional view of the relay optical system according to the fourth embodiment of the present invention taken along the optical axis.

FIG. 6 shows the fourth embodiment of the relay optical system according to the present invention. This embodiment is directed to the relay optical system of the second configuration, where the first unit G1 with a negative refracting power is composed of a negative meniscus lens directing a convex surface thereof toward the intermediate image side, and the second unit G2 with a positive refracting power is composed of, in order from the intermediate image side, a cemented lens having a positive lens and a negative lens arranged in this order, and a positive lens.

The cemented lens of the second unit G2 with a positive refracting power is constructed of a biconvex lens and a negative meniscus lens directing a concave surface thereof toward the intermediate image side and has a positive refracting power as a whole. The positive lens of the second unit G2 with a positive refracting power is a biconvex lens.

The numerical data of this embodiment are shown below.

| Surface No. (r) | R | T | nd | vd |
|---|---|---|---|---|
| 1 | INF | 11.8417 | | |
| 2 | 32.1231 | 4.0000 | 1.69895 | 30.13 |
| 3 | 20.1111 | 3.0925 | | |
| 4 | 55.7176 | 10.6575 | 1.51633 | 64.14 |
| 5 | −16.7356 | 3.8973 | 1.74077 | 27.79 |
| 6 | −43.3920 | 1.0000 | | |
| 7 | 55.3289 | 9.0162 | 1.69100 | 54.82 |
| 8 | −39.7557 | 30.1409 | | |
| 9 | INF | | | |

Regarding the spherical aberration, astigmatism and distortion of this embodiment, aberration diagrams are shown in FIGS. 7A–7C.

Embodiment 5

Figure 8:
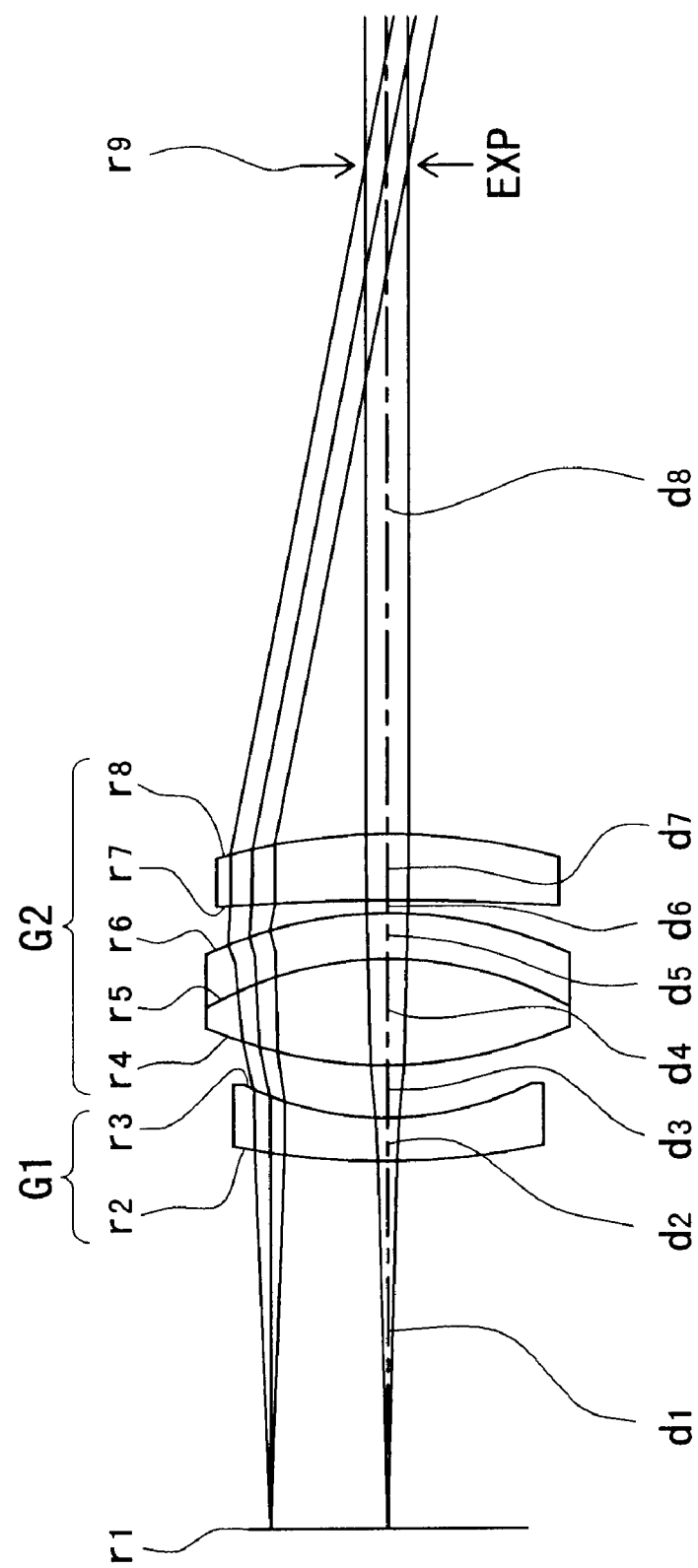
FIG. 8 is a sectional view of the relay optical system according to the fifth embodiment of the present invention taken along the optical axis.

FIG. 8 shows the fifth embodiment of the relay optical system according to the present invention. In this embodiment also, as in Embodiment 4, the first unit G1 with a negative refracting power is composed of a negative meniscus lens directing a convex surface thereof toward the intermediate image side, and the second unit G2 with a positive refracting power is composed of, in order from the intermediate image side, a cemented lens having a positive lens and a negative lens arranged in this order, and a positive lens.

The cemented lens of the second unit G2 with a positive refracting power is constructed of a biconvex lens and a negative meniscus lens directing a concave surface thereof toward the intermediate image side and has a positive refracting power as a whole. The positive lens of the second unit G2 with a positive refracting power is a positive meniscus lens directing a concave surface thereof toward the intermediate image side.

The numerical data of this embodiment are shown below.

| Surface No. (r) | R | T | nd | vd |
|---|---|---|---|---|
| 1 | INF | 35.5987 | | |
| 2 | 89.0738 | 4.0000 | 1.69895 | 30.13 |
| 3 | 27.0854 | 5.2995 | | |
| 4 | 38.2208 | 11.0000 | 1.51633 | 64.14 |
| 5 | −27.3767 | 4.0000 | 1.74077 | 27.79 |
| 6 | −35.9861 | 1.8190 | | |
| 7 | −110.2847 | 6.0000 | 1.69100 | 54.82 |
| 8 | −61.0450 | 65.6468 | | |
| 9 | INF | | | |

Aberration diagrams of this embodiment are similar to those of Embodiment 4 and can be calculated by ray tracing using the above numerical data. Therefore, they are not shown.

Embodiment 6

Figure 9:
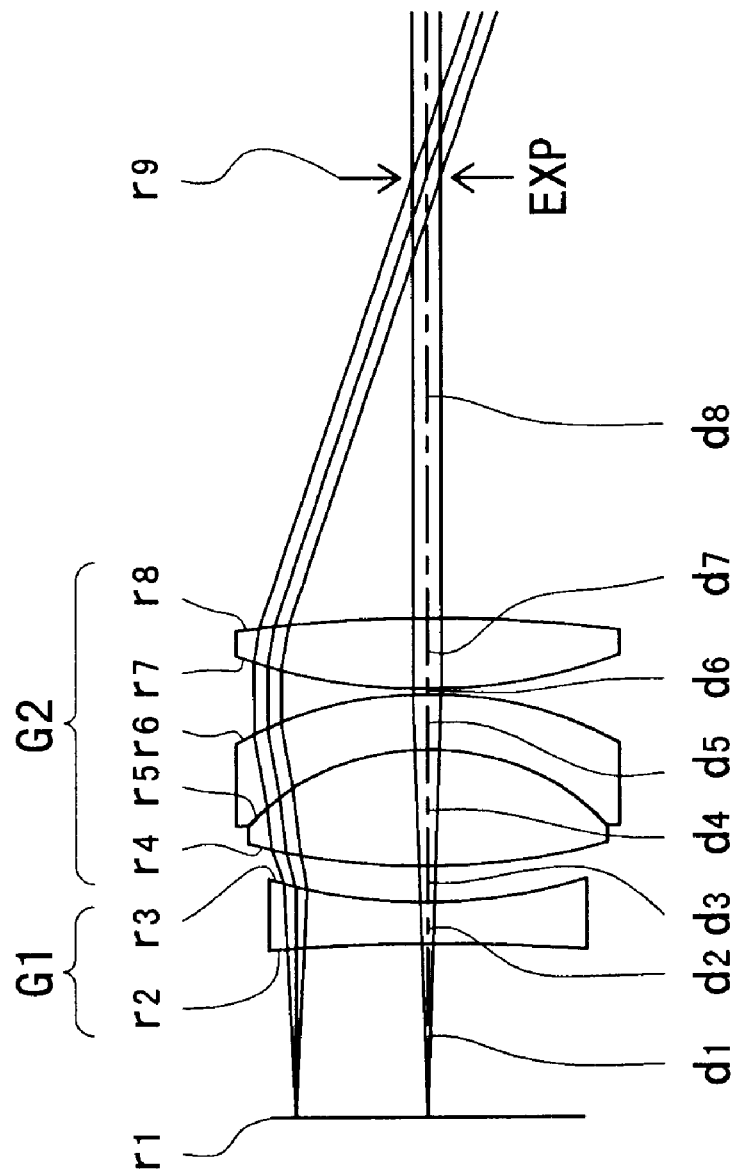
FIG. 9 is a sectional view of the relay optical system according to the sixth embodiment of the present invention taken along the optical axis.

FIG. 9 shows the sixth embodiment of the relay optical system according to the present invention. This embodiment is directed to the relay optical system of the third configuration, where the first unit G1 with a negative refracting power is composed of a biconcave lens, and the second unit G2 with a positive refracting power is composed of, in order from the intermediate image side, a cemented lens having a positive lens and a negative lens arranged in this order, and a positive lens.

The cemented lens of the second unit G2 with a positive refracting power is constructed of a biconvex lens and a negative meniscus lens directing a concave surface thereof toward the intermediate image side and has a positive refracting power as a whole. The positive lens of the second unit G2 with a positive refracting power is a biconvex lens.

The numerical data of this embodiment are shown below.

| Surface No. (r) | R | T | nd | vd |
|---|---|---|---|---|
| 1 | INF | 14.6795 | | |
| 2 | −417.2840 | 3.5000 | 1.68893 | 31.07 |
| 3 | 34.6376 | 3.6016 | | |
| 4 | 47.5064 | 10.9500 | 1.49700 | 81.54 |
| 5 | −18.3517 | 3.8598 | 1.74077 | 27.79 |
| 6 | −29.4224 | 0.5000 | | |
| 7 | 47.2898 | 6.4300 | 1.74100 | 52.64 |
| 8 | −157.4495 | 38.5181 | | |
| 9 | INF | | | |

Regarding the spherical aberration, astigmatism and distortion of this embodiment, aberration diagrams are shown in FIGS. 10A–10C.

Embodiment 7

Figure 11:
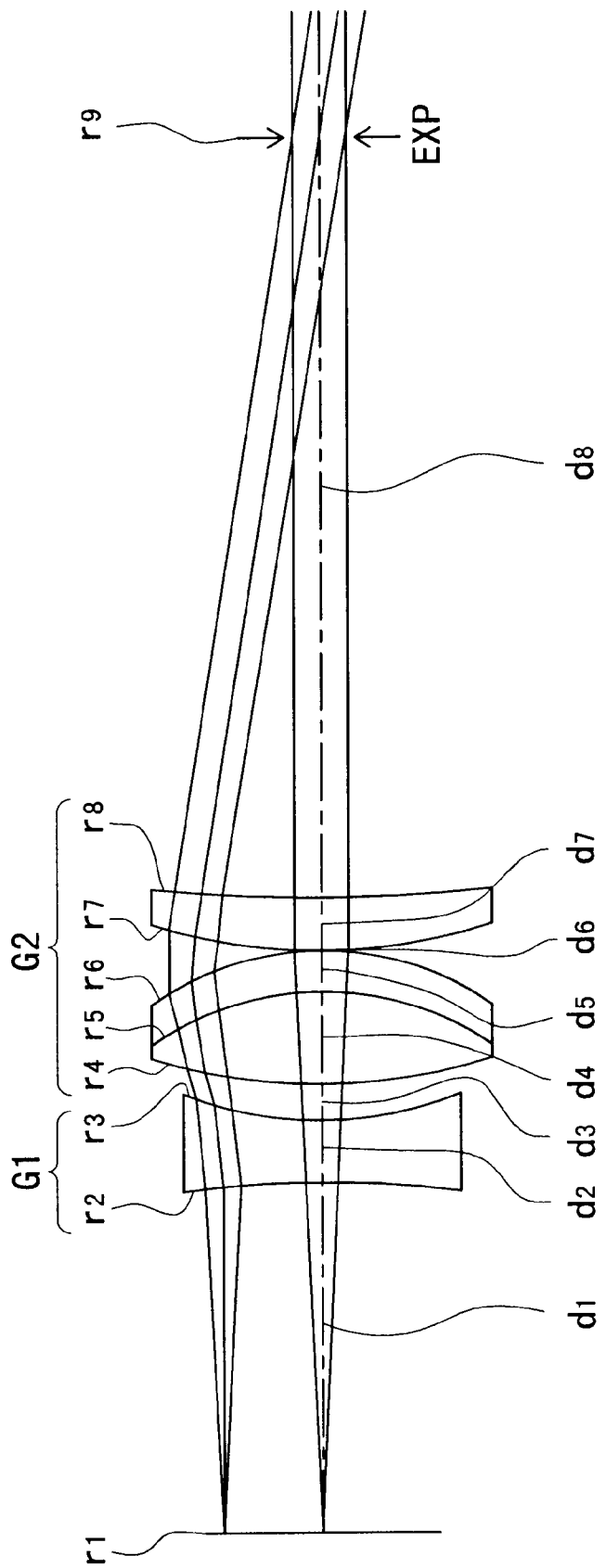
FIG. 11 is a sectional view of the relay optical system according to the seventh embodiment of the present invention taken along the optical axis.

FIG. 11 shows the seventh embodiment of the relay optical system according to the present invention. In this embodiment also, as in Embodiment 6, the first unit G1 with a negative refracting power is composed of a biconcave lens, and the second unit G2 with a positive refracting power is composed of, in order from the intermediate image side, a cemented lens having a positive lens and a negative lens arranged in this order, and a positive lens.

The cemented lens of the second unit G2 with a positive refracting power is constructed of a biconvex lens and a negative meniscus lens directing a concave surface thereof toward the intermediate image side and has a positive refracting power as a whole. The positive lens of the second unit G2 with a positive refracting power is a positive meniscus lens directing a convex surface thereof toward the intermediate image side.

The numerical data of this embodiment are shown below.

| Surface No. (r) | R | T | nd | vd |
|---|---|---|---|---|
| 1 | INF | 41.1156 | | |
| 2 | −89.8328 | 7.5000 | 1.68893 | 31.07 |
| 3 | 41.3356 | 3.7277 | | |
| 4 | 56.6411 | 11.0304 | 1.49700 | 81.54 |
| 5 | −31.3968 | 4.6442 | 1.74077 | 27.79 |
| 6 | −33.6487 | 0.5000 | | |
| 7 | 59.6636 | 5.9477 | 1.74100 | 52.64 |
| 8 | 146.6294 | 88.0016 | | |
| 9 | INF | | | |

Aberration diagrams of this embodiment are similar to those of Embodiment 6 and can be calculated by ray tracing using the above numerical data. Therefore, they are not shown.

Embodiment 8

Figure 12:
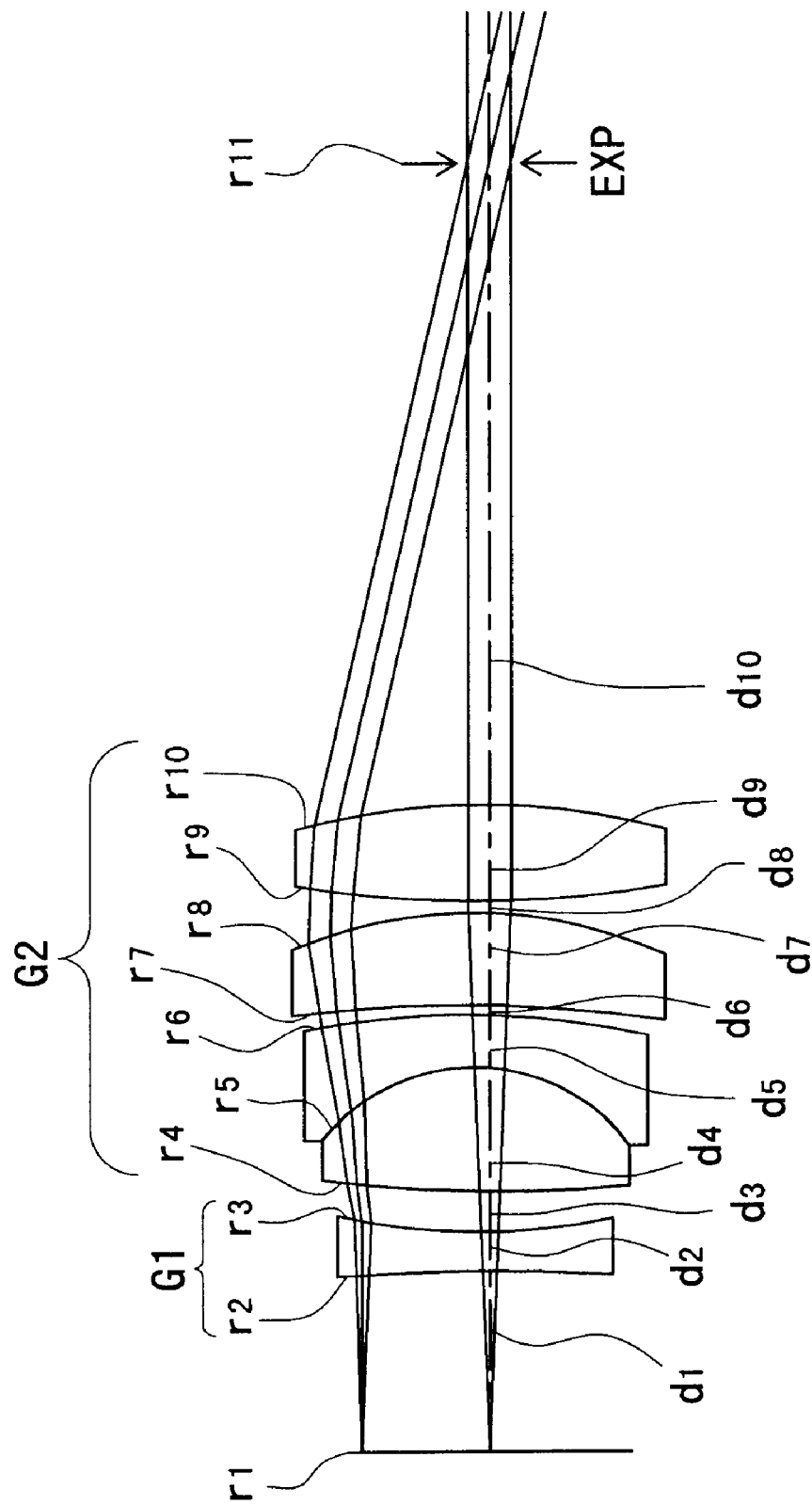
FIG. 12 is a sectional view of the relay optical system according to the eighth embodiment of the present invention taken along the optical axis.

FIG. 12 shows the eighth embodiment of the relay optical system 3 according to the present invention. This embodiment is directed to the relay optical system of the fourth configuration, where the first unit G1 with a negative refracting power is composed of a biconcave lens, and the second unit G2 with a positive refracting power is composed of, in order from the intermediate image side to the exit pupil EXP side, a cemented lens having a biconvex lens and a negative meniscus lens arranged in this order, a positive meniscus lens, and a biconvex lens.

The numerical data of this embodiment are shown below.

| Surface No. (r) | R | T | nd | vd |
|---|---|---|---|---|
| 1 | INF | 16.525 | | |
| 2 | −161.132 | 4.000 | 1.67270 | 32.1 |
| 3 | 59.307 | 3.834 | | |
| 4 | 164.121 | 11.500 | 1.51633 | 64.1 |
| 5 | −17.261 | 5.000 | 1.67270 | 32.1 |
| 6 | −70.640 | 0.897 | | |
| 7 | −146.124 | 8.500 | 1.69100 | 54.8 |
| 8 | −42.677 | 1.179 | | |
| 9 | 83.910 | 9.000 | 1.48749 | 70.2 |
| 10 | −70.958 | 60.042 | | |
| 11 | INF | | | |

Figure 13:
FIGS. 13A–13C are aberration diagrams regarding the eighth embodiment.

Regarding the spherical aberration, astigmatism and distortion of this embodiment, aberration diagrams are shown in FIGS. 13A–13C.

Embodiment 9

Figure 14:
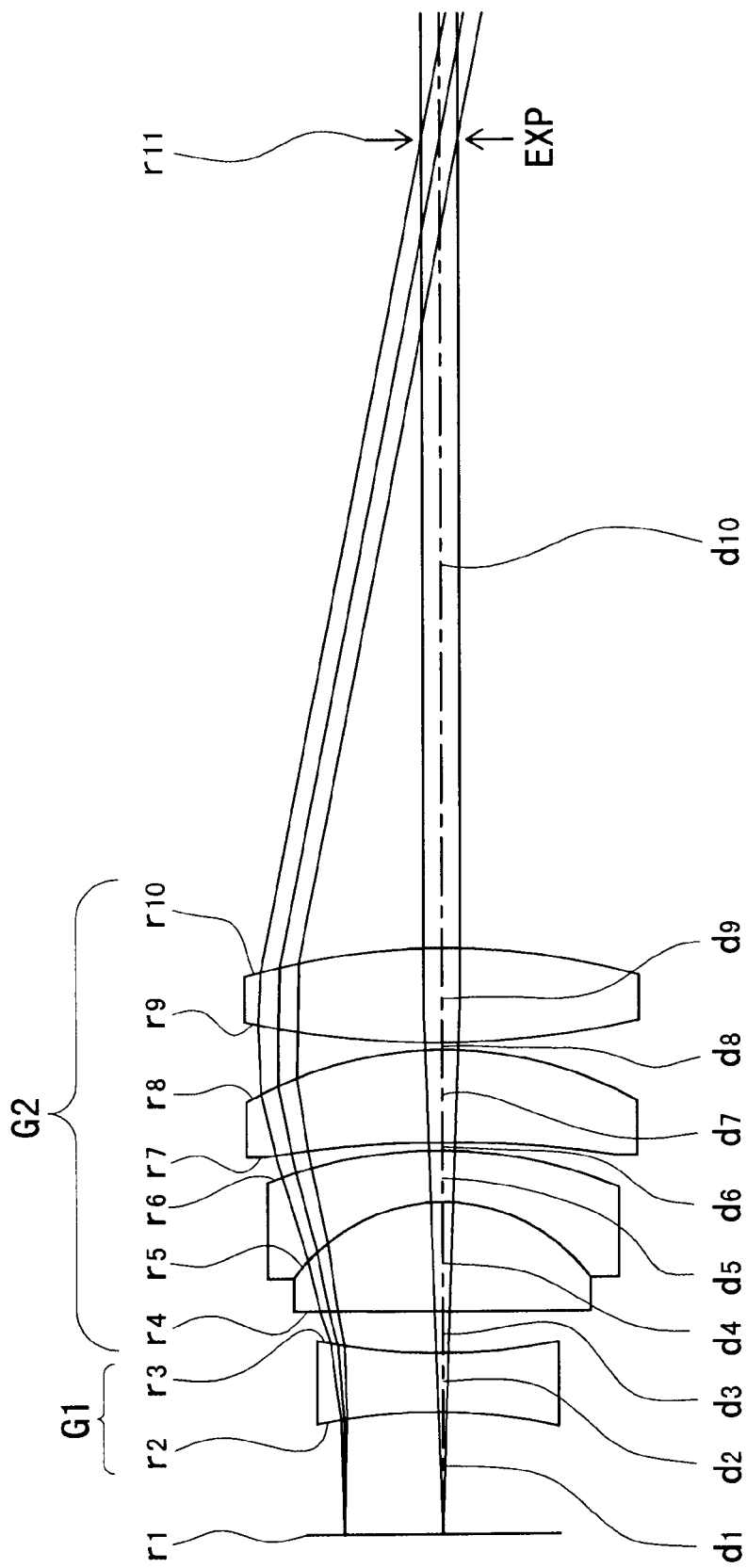
FIG. 14 is a sectional view of the relay optical system according to the ninth embodiment of the present invention taken along the optical axis.

FIG. 14 shows the ninth embodiment of the relay optical system 3 according to the present invention. In this embodiment also, as in Embodiment 8, the first unit G1 with a negative refracting power is composed of a biconcave lens, and the second unit G2 with a positive refracting power is composed of, in order from the intermediate image side to the exit pupil EXP side, a cemented lens having a biconvex lens and a negative meniscus lens arranged in this order, a positive meniscus lens, and a biconvex lens.

The numerical data of this embodiment are shown below.

| Surface No. (r) | R | T | nd | vd |
|---|---|---|---|---|
| 1 | INF | 13.760 | | |
| 2 | −48.961 | 6.322 | 1.67270 | 32.1 |
| 3 | 56.714 | 3.801 | | |
| 4 | 1127.439 | 13.001 | 1.51633 | 64.1 |
| 5 | −18.977 | 5.650 | 1.74077 | 27.8 |
| 6 | −51.619 | 0.891 | | |
| 7 | −116.867 | 10.241 | 1.69100 | 54.8 |
| 8 | −40.394 | 1.012 | | |
| 9 | 107.267 | 10.501 | 1.48749 | 70.2 |
| 10 | −74.855 | 90.020 | | |
| 11 | INF | | | |

Aberration diagrams of this embodiment are similar to those of Embodiment 8 and can be calculated by ray tracing using the above numerical data. Therefore, they are not shown.

Embodiment 10

Figure 15:
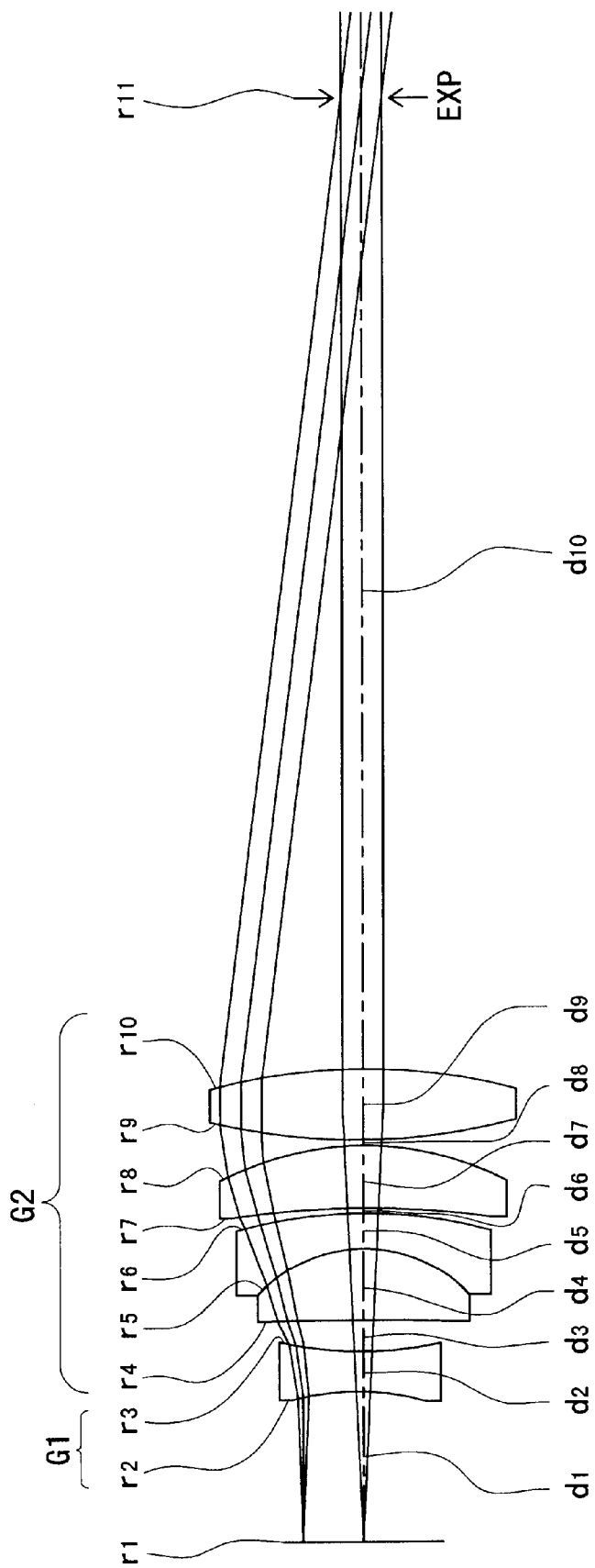
FIG. 15 is a sectional view of the relay optical system according to the tenth embodiment of the present invention taken along the optical axis.

FIG. 15 shows the tenth embodiment of the relay optical system 3 according to the present invention. In this embodiment, the first unit G1 with a negative refracting power is composed of a biconcave lens, and the second unit G2 with a positive refracting power is composed of, in order from the intermediate image side to the exit pupil EXP side, a cemented lens having a positive meniscus lens and a negative meniscus lens arranged in this order, a positive meniscus lens, and a biconvex lens.

The numerical data of this embodiment are shown below.

| Surface No. (r) | R | T | nd | vd |
|---|---|---|---|---|
| 1 | INF | 23.944 | | |
| 2 | −29.587 | 6.636 | 1.67270 | 32.1 |
| 3 | 55.474 | 3.800 | | |
| 4 | −8532.319 | 13.001 | 1.51633 | 64.1 |
| 5 | −23.530 | 5.651 | 1.67270 | 32.1 |
| 6 | −76.030 | 0.891 | | |
| 7 | −116.940 | 10.241 | 1.69100 | 54.8 |
| 8 | −42.171 | 0.997 | | |
| 9 | 110.106 | 12.000 | 1.48749 | 70.2 |
| 10 | −75.694 | 159.930 | | |
| 11 | INF | | | |

Aberration diagrams of this embodiment are similar to those of Embodiment 8 and can be calculated by ray tracing using the above numerical data. Therefore, they are not shown.

Embodiment 11

Figure 16:
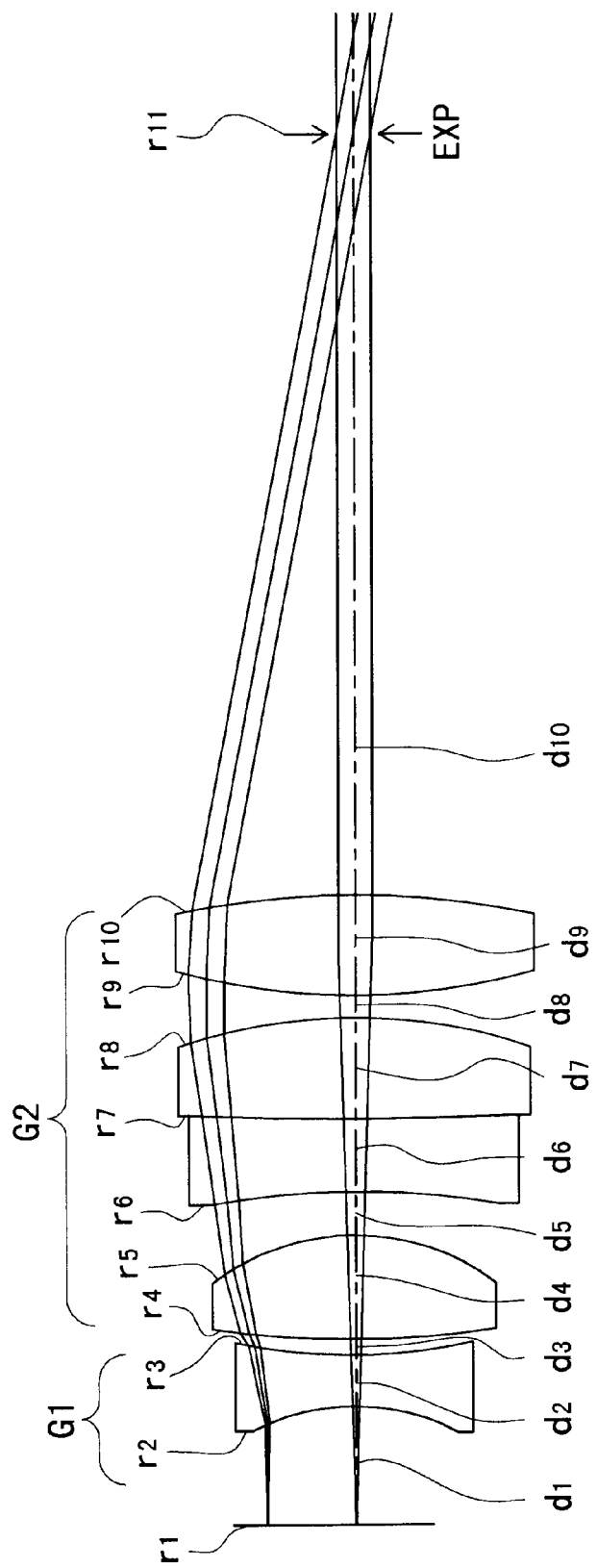
FIG. 16 is a sectional view of the relay optical system according to the eleventh embodiment of the present invention taken along the optical axis.

FIG. 16 shows the eleventh embodiment of the relay optical system 3 according to the present invention. This embodiment is directed to the relay optical system of the fifth configuration, where the first unit G1 with a negative refracting power is composed of a biconcave lens, and the second unit G2 with a positive refracting power is composed of, in order from the intermediate image side to the exit pupil EXP side, a biconvex lens, a cemented lens having a biconcave lens and a biconvex lens arranged in this order, and a biconvex lens.

The numerical data of this embodiment are shown below.

| Surface No. (r) | R | T | nd | vd |
|---|---|---|---|---|
| 1 | INF | 13.679 | | |
| 2 | −26.706 | 5.965 | 1.69895 | 30.1 |
| 3 | 74.140 | 1.987 | | |
| 4 | 139.326 | 12.000 | 1.48749 | 70.2 |
| 5 | −27.722 | 5.356 | | |
| 6 | −92.405 | 8.390 | 1.80518 | 25.4 |
| 7 | 513.709 | 12.000 | 1.71300 | 53.9 |
| 8 | −61.407 | 2.635 | | |
| 9 | 74.608 | 12.000 | 1.48749 | 70.2 |
| 10 | −105.704 | 90.029 | | |
| 11 | INF | | | |

Figure 17A:
FIGS. 17A–17C are aberration diagrams regarding the eleventh embodiment.
Figure 17B:
Figure 17C:

Regarding the spherical aberration, astigmatism and distortion of this embodiment, aberration diagrams are shown in FIGS. 17A–17C.

Embodiment 12

Figure 18:
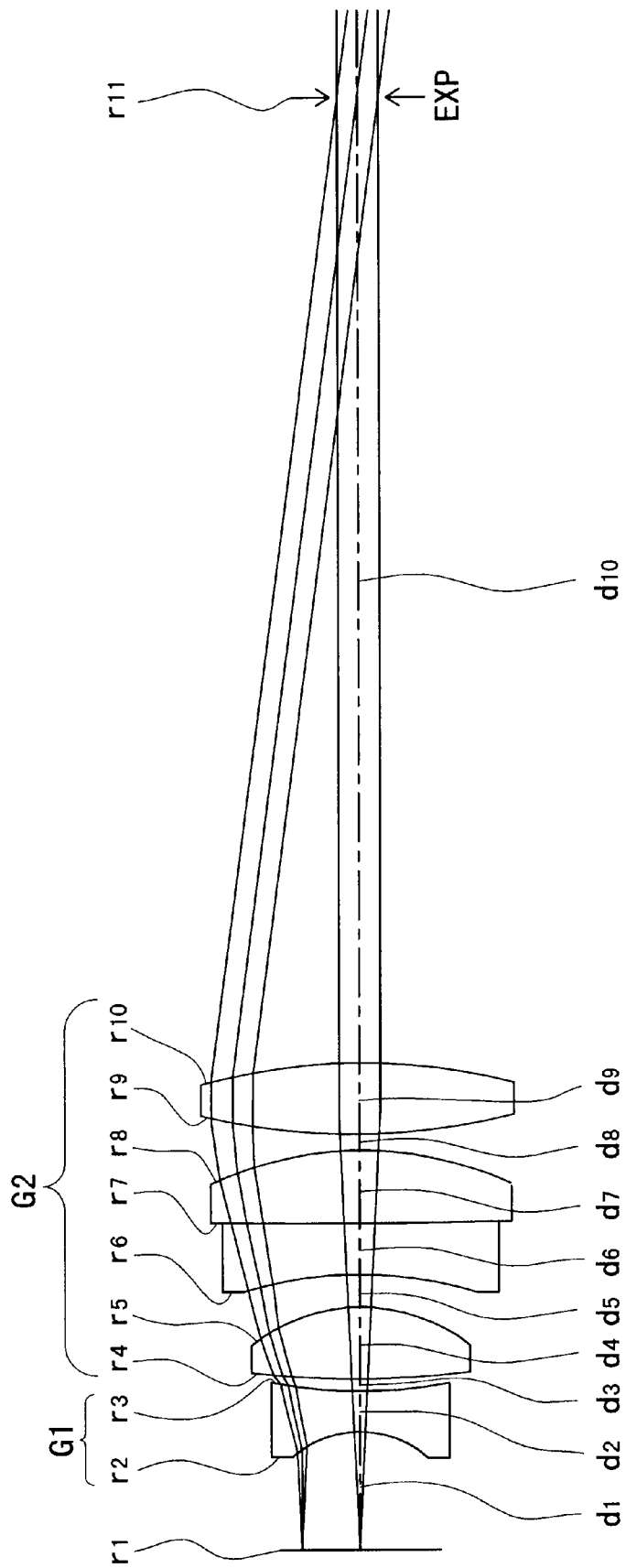
FIG. 18 is a sectional view of the relay optical system according to the twelfth embodiment of the present invention taken along the optical axis.

FIG. 18 shows the twelfth embodiment of the relay optical system 3 according to the present invention. In this embodiment also, as in Embodiment 11, the first unit G1 with a negative refracting power is composed of a biconcave lens, and the second unit G2 with a positive refracting power is composed of, in order from the intermediate image side to the exit pupil EXP side, a biconvex lens, a cemented lens having a biconcave lens and a biconvex lens arranged in this order, and a biconvex lens.

The numerical data of this embodiment are shown below.

| Surface No. (r) | R | T | nd | vd |
|---|---|---|---|---|
| 1 | INF | 19.510 | | |
| 2 | −17.412 | 6.237 | 1.66680 | 33.0 |
| 3 | 68.007 | 1.984 | | |
| 4 | 186.835 | 12.000 | 1.49700 | 81.5 |
| 5 | −27.475 | 5.338 | | |
| 6 | −65.134 | 8.384 | 1.69895 | 30.1 |
| 7 | 6455.163 | 12.000 | 1.71999 | 50.2 |
| 8 | −56.655 | 2.554 | | |
| 9 | 82.158 | 12.000 | 1.49700 | 81.5 |
| 10 | −121.624 | 159.616 | | |
| 11 | INF | | | |

Aberration diagrams of this embodiment are similar to those of Embodiment 11 and can be calculated by ray tracing using the above numerical data. Therefore, they are not shown.

Embodiment 13

Figure 19:
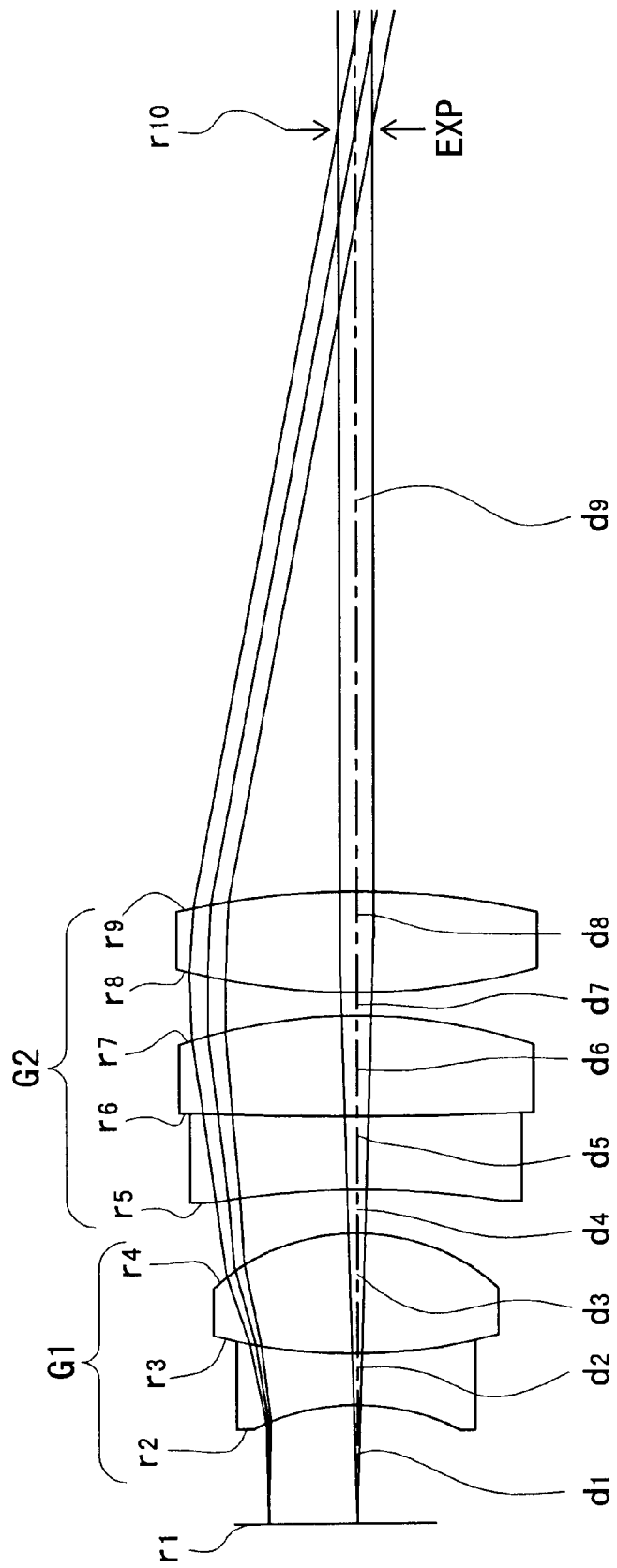
FIG. 19 is a sectional view of the relay optical system according to the thirteenth embodiment of the present invention taken along the optical axis.

FIG. 19 shows the thirteenth embodiment of the relay optical system 3 according to the present invention. This embodiment is directed to the relay optical system of the sixth configuration, where, in order from the intermediate image side to the exit pupil EXP side, the first unit G1 with a negative refracting power is composed of a cemented lens having a biconcave lens and a biconvex lens, and the second unit G2 with a positive refracting power is composed of a cemented lens having a biconcave lens and a biconvex lens, and a biconvex lens.

The numerical data of this embodiment are shown below.

| Surface No. (r) | R | T | nd | vd |
|---|---|---|---|---|
| 1 | INF | 15.872 | | |
| 2 | −23.730 | 5.936 | 1.69895 | 30.1 |
| 3 | 47.648 | 13.000 | 1.48749 | 70.2 |
| 4 | −28.792 | 5.218 | | |
| 5 | −123.019 | 7.456 | 1.74077 | 27.8 |
| 6 | 381.794 | 12.000 | 1.71300 | 53.9 |
| 7 | −62.976 | 2.702 | | |
| 8 | 67.135 | 12.000 | 1.48749 | 70.2 |
| 9 | −130.910 | 90.018 | | |
| 10 | INF | | | |

Regarding the spherical aberration, astigmatism and distortion of this embodiment, aberration diagrams are shown in FIGS. 20A–20C.

Embodiment 14

FIG. 21 shows the fourteenth embodiment of the relay optical system 3 according to the present invention. In this embodiment also, as in Embodiment 13, in order from the intermediate image side to the exit pupil EXP side, the first unit G1 with a negative refracting power is composed of a cemented lens having a biconcave lens and a biconvex lens, and the second unit G2 with a positive refracting power is composed of a cemented lens having a biconcave lens and a biconvex lens, and a biconvex lens. The numerical data of this embodiment are shown below.

| Surface No. (r) | R | T | nd | vd |
|---|---|---|---|---|
| 1 | INF | 19.914 | | |
| 2 | −19.999 | 7.000 | 1.69895 | 30.1 |
| 3 | 47.061 | 14.000 | 1.48749 | 70.2 |
| 4 | −27.329 | 5.207 | | |
| 5 | −107.890 | 7.453 | 1.6398 | 34.5 |
| 6 | 178.145 | 12.000 | 1.71999 | 50.2 |
| 7 | −72.924 | 2.626 | | |
| 8 | 71.985 | 11.997 | 1.48749 | 70.2 |
| 9 | −154.063 | 120.725 | | |
| 10 | INF | | | |

Aberration diagrams of this embodiment are similar to those of Embodiment 13 and can be calculated by ray tracing using the above numerical data. Therefore, they are not shown.

Values regarding the above-disclosed numerical conditions in the cases of the above-described embodiments are compiled in the table below, where IM. H represents the size of the intermediate image and NA represents the numerical aperture on the entrance side (intermediate image side).

| | Emb. 1 | Emb. 2 | Emb. 3 | Emb. 4 | Emb. 5 | Emb. 6 | Emb. 7 |
|---|---|---|---|---|---|---|---|
| f | 30.000 | 24.994 | 30.000 | 31.7042 | 60.3499 | 34.3033 | 71.4275 |
| $f_1$ | −88.077 | −44.754 | −240.000 | −89.1616 | −57.2027 | −46.2776 | −40.1552 |
| $f_2$ | 31.060 | 25.843 | 33.615 | 26.1018 | 35.8568 | 25.2523 | 34.0467 |
| $f_1/f$ | −2.936 | −1.791 | −8.000 | −2.8123 | −0.9479 | −1.3491 | −0.5622 |
| $f_2/f$ | 1.035 | 1.034 | 1.121 | 0.8233 | 0.5941 | 0.7361 | 0.4767 |
| $d_{EXP}$ | 35.930 | 35.587 | 31.053 | 30.1409 | 65.6468 | 38.5181 | 88.0016 |
| $d_{EXP}/f$ | 1.198 | 1.424 | 1.035 | 0.9507 | 1.0878 | 1.1229 | 1.2320 |
| L | 31.600 | 28.400 | 33.200 | 31.663 | 32.118 | 28.841 | 33.350 |
| L/f | 1.05 | 1.14 | 1.11 | 1.00 | 0.53 | 0.84 | 0.47 |
| IM.H | 10.00 | 8.00 | 10.00 | 11.00 | 11.00 | 11.00 | 11.00 |
| NA | 0.04 | 0.04 | 0.04 | 0.04 | 0.04 | 0.04 | 0.04 |

| | Emb. 8 | Emb. 9 | Emb. 10 | Emb. 11 | Emb. 12 | Emb. 13 | Emb. 14 |
|---|---|---|---|---|---|---|---|
| f | 48.149 | 54.558 | 80.657 | 55.651 | 75.355 | 56.802 | 67.942 |
| $f_1$ | −63.976 | −38.144 | −27.812 | −27.423 | −20.200 | −94.411 | −77.202 |
| $f_2$ | 37.458 | 38.815 | 42.251 | 36.328 | 37.630 | 58.306 | 65.837 |
| $f_1/f$ | −1.329 | −0.699 | −0.345 | −0.493 | −0.268 | −1.662 | −1.136 |
| $f_2/f$ | 0.778 | 0.711 | 0.524 | 0.653 | 0.499 | 1.026 | 0.969 |
| $d_{EXP}$ | 60.042 | 90.020 | 159.930 | 90.029 | 159.616 | 90.018 | 120.725 |
| $d_{EXP}/f$ | 1.247 | 1.650 | 1.983 | 1.618 | 2.118 | 1.585 | 1.777 |
| L | 43.909 | 51.420 | 53.217 | 60.333 | 60.497 | 58.313 | 60.284 |
| L/f | 0.91 | 0.94 | 0.66 | 1.08 | 0.80 | 1.03 | 0.89 |
| IM.H | 10.00 | 10.00 | 10.00 | 10.00 | 10.00 | 10.00 | 10.00 |
| NA | 0.04 | 0.04 | 0.04 | 0.04 | 0.04 | 0.04 | 0.04 |

As described above, according to the present invention, it is possible to provide a relay optical system that allows, for photographing a sample image using a photographing apparatus, the photographing apparatus to be mounted on a microscope without the microscope and the photographing apparatus excluding each other from their predetermined positions.

What is claimed is:

1. A relay optical system comprising, in order from an intermediate image position toward an exit side;

a first unit having a negative refracting power; and a second unit having a positive refracting power;

wherein a distance from a rearmost lens surface of said second unit to an exit pupil position is at least 30 mm, wherein the distance from the rearmost lens surface of said second unit to the exit pupil position is in a range from 30 mm to 90 mm, and wherein said first unit comprises a negative meniscus lens directing a convex surface thereof toward the intermediate image position and said unit comprises a cemented lens and a positive lens.

2. A relay optical system comprising, in order from an intermediate image position toward an exit side;

a first unit having a negative refracting power; and a second unit having a positive refracting power;

wherein a distance from a rearmost lens surface of said second unit to an exit pupil position is at least 30 mm, and wherein the following condition is satisfied:

$0.3 \leq L/f \leq 1.25$ where L is a total length of said relay optical system defined by a distance from a lens surface on which light is first incident to a lens surface from which the light is emergent lastly, and f is a focal length of said relay optical system.

3. A relay optical system comprising, in order from an intermediate image position toward an exit side:

a first unit having a negative refracting power; and a second unit having a positive refracting power;

wherein a distance from a rearmost lens surface of said second unit to an exit pupil position is at least 30 mm, and wherein the following conditions are satisfied:

$-12 \leq f_1/f \leq -0.2$ $0.45 \leq f_2/f \leq 1.5$ $0.9 \leq d_{EXP}/f \leq 2.5$ where f is a focal length of said relay optical system, $f_1$ is a focal length of said first unit, $f_2$ is a focal length of said second unit, and $d_{EXP}$ is the distanced from the rearmost surface of side second unit to the exit pupil position.

4. A relay optical system comprising, in order from an intermediate image position toward an exit side;

a first unit having a negative refracting power;

a second unit having a positive refracting power;

wherein a distance from a rearmost lens surface of said second unit to an exit pupil position is at least 30 mm, wherein the distance from the rearmost lens surface of said second unit to the exit pupil position is in a range from 30 mm to 160 mm, and wherein the following conditions are satisfied:

$-12 \leq f_1/f \leq -0.5$ $0.45 \leq f_2/f \leq 1.5$ $0.9 \leq d_{EXP}/f \leq 1.5$ where f is a focal length of said relay optical system, $f_1$ is a focal length of said first unit, $f_2$ is a focal length of said second unit, and $d_{EXP}$ is the distance from the rearmost surface of said second unit to the exit pupil position.

5. A relay optical system comprising, in order from an intermediate image position toward an exit side;

a first unit having a negative refracting power; and a second unit having a positive refracting power;

wherein a distance from a rearmost lens surface of said second unit to an exit pupil position is at least 30 mm, wherein the distance from the rearmost lens surface of said second unit to the exit pupil position is in a range from 30 mm to 160 mm, and wherein the following conditions are satisfied:

$-2 \leq f_1/f \leq -0.2$ $0.45 \leq f_2/f \leq 1.2$ $1 \leq d_{EXP}/f \leq 2.5$ where f is a focal length of said relay optical system, $f_1$ is a focal length of said first unit, $f_2$ is a focal length of said second unit, and $d_{EXP}$ is the distance from the rearmost surface of said second unit to the exit pupil position.

6. A relay optical system comprising, in order from an intermediate image position toward an exit side:

a first unit having a negative refracting power; and a second unit having a positive refracting power;

wherein a distance from a rearmost lens surface of said second unit to an exit pupil position is at least 30 mm, and wherein said first unit comprises a negative meniscus lens directing a convex surface thereof toward the intermediate image position and said second unit comprises a cemented lens and a positive lens.

* * * * *